2,920,086

CHEMICAL COMPOUNDS AND METHODS FOR THE PREPARATION THEREOF

William S. Barnhart, Cranford, Robert H. Wade, West Paterson, Donald W. Wujciak, Union, and Joseph L. Zollinger, Bloomfield, N.J., assignors, by mesne assignments, to Minnesota Mining and Manufacturing Company, St. Paul, Minn., a corporation of Delaware No Drawing. Application August 25, 1955
Serial No. 530,610

1 Claim. (Cl. 260—399)

This invention relates to novel organic nitrogen containing salts of perchlorofluorocarboxylic acids and to methods for the preparation thereof.

The novel salts of this invention are useful as quantitative precipitants for perchlorofluorocarboxylic acids, as rust, corrosion and oxidation inhibitors, and as surface active agents.

The salts of the present invention may be prepared by reacting a perchlorofluoromono- or polycarboxylic acid, preferably containing from 4 to 20 carbon atoms, with an organic nitrogen-containing compound including the hydrazines such as phenylhydrazine, substituted hydrazines such as semi-carbazide, imino compounds such as iminoethers, urea and substituted ureas such as thiourea, amidines such as methylamidine, and aliphatic, aromatic, alicyclic or heterocyclic primary, secondary and tertiary amines or polyamines such as pyridine, methylaniline, β-naphthylamine and methylamine, and amines substituted with other functional groups such as diethanolamine, methylamino ether, dichloroethylamine, and the like.

The perchlorofluorocarboxylic acids which may be used may be prepared in a variety of ways. For example, they may be produced by subjecting perhalogenated aliphatic olefins having at least 7 carbon atoms and being at least half fluorinated to oxidation conditions in the presence of a vigorous oxygen containing oxidation reagent, such as free oxygen in the presence of ultraviolet light, free oxygen in the presence of ultraviolet light and elemental chlorine, free oxygen in the presence of elemental fluorine, and permanganate salts in a liquid medium. Preparation of the acids according to this method is disclosed in copending application Serial No. 452,706, filed August 27, 1954.

The acids may also be prepared by subjecting aliphatic perhalogenated high polymers to thermal cracking conditions to produce lower molecular weight materials having molecular weights in the oil or wax range and subjecting these materials to oxidation at a temperature not higher than about 10° C. in the presence of a permanganate salt in a liquid medium. Processes of this type are disclosed in copending application Serial No. 452,704, filed August 27, 1954.

Another method for the preparation of perchlorofluorocarboxylic acids which are useful in the present invention comprises treating fluorine-containing telomers, having the formula $$R(CF_2-CX_1X_2)_nBr$$

in which R is a perhalomethyl radical having a total atomic weight not higher than 146.5, $X_1$ and $X_2$ are fluorine or chlorine atoms, and $n$ is an integer from 2 to 16, with fuming sulfuric acid at a temperature of at least 125° C. This process produces carboxylic acids having the formula

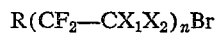

$$Z(CF_2-CFCl)_{n-1}CF_2COOH$$

in which Z is a carboxylic acid radical or a perhalomethyl radical having a total atomic weight not in excess of 146.5 and $n$ is an integer from 2 to 16. The preparation of these acids is disclosed in copending application Serial No. 452,703, filed August 27, 1954, now issued as U.S. Patent No. 2,806,865 on September 17, 1957.

The preferred process for the preparation of perchlorofluorocarboxylic acids useful in the process of the present invention is the hydrolysis of telomers produced by telomerizing perhaloolefins using sulfuryl chloride as a telogen, the preferred telomer being the telomerization product of chlorotrifluoroethylene and sulfuryl chloride. The hydrolyzed telomer has the formula

$$Z-CFCl-(CF_2CFCl)_{n-2}-CF_2COOH$$

in which Z is a carboxylic acid radical or a perhalomethyl radical in which all the halogen atoms are fluorine or chlorine and $n$ is an integer from 2 to 16. The preparation of these acids is disclosed in copending application Serial No. 452,705, filed August 27, 1954, now issued as U.S. Patent No. 2,806,866 on September 17, 1957.

The reaction of the perchlorofluorocarboxylic acid and the organic nitrogen-containing compound may be effected in an aqueous or a non-aqueous system in the presence or absence of organic solvents such as ethyl ether, chloroform, carbon tetrachloride, benzene, methylene chloride, petroleum ether, and the like. If a solvent is used, it is present in a weight percent ratio of perchlorofluorocarboxylic acid or nitrogen-containing compound to solvent of between about 100 to 1 and about 1 to 100, preferably between about 75 to 25 and about 20 to 80. Both the acid and the nitrogen-containing compound may be dissolved in the same or different solvents, the solvent serving to dissipate the heat of reaction and to insure better mixing of the reactants.

Gaseous nitrogen-containing compounds may be reacted in solution by dissolving the gas in a solvent of the type heretofore described or by forming a water soluble salt of the nitrogen-containing compound dissolved in an aqueous solution. The nitrogen-containing compound may also be reacted as a gas by bubbling it through a solution of the acid. Where a water insoluble amine is the alkaline reactant, an aqueous solution of the acid salt of the amine, such as salts formed from hydrochloric, acetic and sulfuric acids, and the like, may be prepared, and this salt is then reacted with a neutralized aqueous solution of the perchlorofluorocarboxylic acid or with the free perchlorofluorocarboxylic acid in water.

The reaction temperature used in the process of this invention may be between about 0 and 100° C., preferably between about 10 and about 40° C. The product begins to form as soon as the reactants are mixed and the reaction is run to completion, which in most cases is attained within about 5 hours, but the reaction may be continued for a longer period up to about 16 hours, if desired.

The molar ratio of perchlorofluorocarboxylic acid to nitrogen-containing compound in the reaction is in the range of about 10 to 1 and about 1 to 10, preferably between about 2 to 1 and 1 to 2. A molar ratio of about 1 to 1 facilitates the isolation and purification of the organic acid addition salt product. The foregoing molar ratios are based upon the use of perchlorofluorocarboxylic acids and nitrogen-containing compounds having one functional group each, and if either the perchlorofluorocarboxylic acid or the basic compound contains more than one functional group, the molar ratio is increased accordingly to compensate in favor of the reactant having the lesser number of functional groups.

In a non-aqueous system, the perchlorofluorocarboxylic acid may be added gradually to the basic compound with sufficient agitation to insure a thorough mixing of the reactants, and in certain cases, where the exothermic nature of the reaction causes the temperature of the reaction mix- to rise above the boiling point of the basic compound, it is necessary to cool the reaction mixture before the boiling point thereof is attained. The crude product, which is generally obtained as an oily liquid or solid, is then purified by crystallization from an organic solvent such as petroleum ether, cyclohexane, alcohol, and the like.

Where a solvent system is used, either the acid and/or the basic compound is dissolved in the same or different solvents and the reaction is run to completion under the conditions described above. The solvent is then removed by boiling and the product preferably is then heated in a vacuum to remove the last traces of solvent. The resulting crude product may be purified by recrystallization.

A variation of the foregoing process is used for the preparation of S-benzylthiuronium salts in which an aqueous solution of an S-benzylthiuronium halide is added to a neutralized aqueous solution of the perchlorofluorocarboxylic acid, having a pH of about 7 to 7.5, under the conditions given above. The salt product, which is precipitated out in a quantitative yield, is washed and recrystallized from water or alcohol-water solution which has been slightly acidified with a mineral acid, preferably hydrochloric acid.

The invention will be further illustrated by reference to the following specific examples:

EXAMPLE 1

*Preparation of S-benzylthiuronium salts of perchlorofluorocarboxylic acids*

S-benzylthiuronium chloride has been used as a quantitative precipitant for perchlorofluorocarboxylic acids in which the general procedure involved the addition of a slight excess of aqueous S-benzylthiuronium chloride solution to a neutralized aqueous solution of perchlorofluorocarboxylic acid, which was adjusted with aqueous sodium potassium hydroxide to a pH of between 7 and 7.5. The precipitate was filtered, washed with water, dried, and the crude product was recrystallized from a water-alcohol solution which had been made slightly acidic. The table below lists some of the S-benzylthiuronium salts prepared by this method.

In the preparation of the diacid salts, the acid was slowly added to a hot solution of the reagent in order to insure the reaction of both carboxyl groups.

| Perchlorofluorocarboxylic acids [1] | Molar Ratio: Acid to Reagent | Amt. of salt product, mole | M.P. of salt product, ° C. |
|---|---|---|---|
| $C_4$ monoacid | 1 to 1 | 1 | 190–191 |
| $C_6$ monoacid | 1 to 1 | 1 | 182 |
| $C_8$ monoacid | 1 to 1 | 1 | 184–184.5 |
| $C_{10}$ monoacid | 1 to 1 | 1 | 162–163 |
| $C_{12}$ monoacid | 1 to 1 | 1 | 162–164 |
| $C_8$ diacid | 1 to 2 | 1 | 178–179 |
| $C_{10}$ diacid | 1 to 2 | 1 | 198–199 |
| $C_{12}$ diacid | 1 to 3 | 1 | 192–194 |

[1] $Cl(CF_2\text{—}CFCl)_nCF_2CO_2H$. $HO_2C(CF_2\text{—}CFCl)_nCO_2H$.

EXAMPLE 2

*Preparation of the cyclohexylamine salt of*
$Cl(CF_2CFCl)_3CF_2COOH$
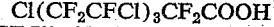

A solution of 0.05 mole of $Cl(CF_2\text{—}CFCl)_3CF_2COOH$ in 25 ml. of ethyl ether was added to 0.05 mole of cyclohexylamine in 15 ml. of ethyl ether. Heat was evolved during the addition. The solvent was evaporated and the solid was recrystallized from cyclohexane to yield 0.0242 mole (48%) of white powder, M.P. 119–121° C. This salt was soluble in all of the common organic solvents, but was insoluble in water.

*Analysis.*—Calc'd. for $C_{14}H_{18}O_2NCl_4F_{11}$: Cl, 24.50. Found: Cl, 24.32.

EXAMPLE 3

*Preparation of the diisopropylamine salt of*
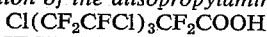

A solution of 0.05 mole of $Cl(CF_2\text{—}CFCl)_3CF_2COOH$ in 25 ml. of ethyl ether was added to 0.05 mole of diisopropylamine. Heat was evolved. The solvent was removed and the oil was crystallized by rubbing and was recrystallized from petroleum ether (B.P. 30–60°) to give 0.0241 mole (48%) of slightly oily crystals, M.P. 52–56° C.; recrystallized once, M.P. 54–56° C. This salt is soluble in all of the common organic solvents but is insoluble in water.

*Analysis.*—Calc'd. for $C_{14}H_{16}O_2NCl_4F_{11}$: Cl, 24.41. Found: Cl, 24.32.

EXAMPLE 4

*Preparation of the trioctyl amine salt of*
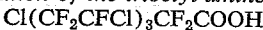
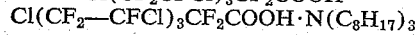

Trioctyl amine was dissolved in dilute hydrochloric acid and added to an aqueous solution of

After about 30 minutes at a temperature of 30° C a sticky precipitate was formed.

EXAMPLE 5

*Preparation of the benzylamine salt of*
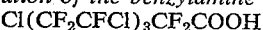
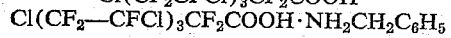

Benzylamine hydrochloride (574 mg.) was dissolved in 10 ml. of water and this solution was added to 100 ml. of an aqueous, nearly neutralized solution containing 2 meq. of $Cl(CF_2CFCl)_3CF_2COOH$. This mixture was stirred for a period of 15 minutes at a temperature of 25° C. and filtered through a sintered glass funnel. A micro crystalline precipitate formed very slowly. The filter was then washed with water and dried in a vacuum oven at a temperature of 25° C.

EXAMPLE 6

*Preparation of the aniline salt of*
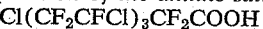
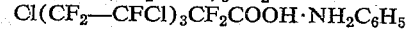

A solution of 24 grams (0.05 mole) of

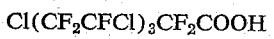

in 60 ml. of petroleum ether (boiling range 30 to 75° C.) and 4.7 grams (0.05 mole) of aniline was stirred at a temperature of 25° C. until the reaction was complete. The solvent was removed by heating on a steam bath and the product was dried in a vacuum oven overnight. The resutling oil-crystal mixture crystallized when agitated. The product was triturated with petroleum ether, filtered, and dried to yield 21 grams of slightly pink crystals, M.P. 92 to 95° C. The aniline salt was slightly soluble in hot cyclo- or n-hexane but oiled out upon cooling. It was crystallized from a polychlorotrifluoroethylene liquid.

EXAMPLE 7

*Preparation of the pyridine salt of*
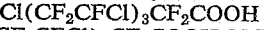
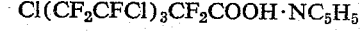

To a solution of 24 grams (0.05 mole) of

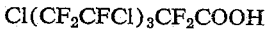

in 60 ml. of petroleum ether (boiling range 30 to 75° C.) were added 4 grams (0.05 mole) of pyridine. A small amount of methylene chloride was added to obtain homogeneity, and the solution was agitated and heated from a temperature of 25° C. until the reaction was complete. The solvent was removed by heating the mixture on a steam bath and the product was placed in a vacuum desiccator. White crystals having a pale orange surface discoloration were obtained; the crystals were soluble in cold benzene, methanol, and hot water and slightly soluble in hot cyclohexane.

EXAMPLE 8

*Preparation of the dimethyl aniline salt of* $Cl(CF_2CFCl)_3CF_2COOH$ $$Cl(CF_2CFCl)_3CF_2COOH \cdot N(CH_3)_2C_6H_5$$

To a solution of 48 grams (0.1 mole) of $$Cl(CF_2CFCl)_3CF_2{+}COOH$$

in about 60 ml. of methylene chloride were added 12 grams (0.1 mole) of dimethylaniline. The solvent was removed by heating on a steam bath and the product was placed in a vacuum desiccator overnight. The viscous yellow-green oil obtained was triturated several times with petroleum ether and the final traces of solvent were removed under reduced pressure. The product weighed 44 grams, and all attempts to crystallize the oil using ordinary methods failed; however, a brittle solid which softened above —40° C. was obtained.

EXAMPLE 9

*Preparation of the monoethanol amine salt of* $Cl(CF_2CFCl)_3CF_2COOH$ $$Cl(CF_2CFCl)_3CF_2COOH \cdot NH_2(C_2H_5OH)$$

To a solution of 17 grams (0.035 mole) of $$Cl(CF_2CFCl)_3{+}CF_2COOH$$

in a methylene chloride-methanol solution was added a slight molar excess of monoethanol amine. The reaction was allowed to proceed to completion at 25° C. and the solvent was then removed. The resulting orange colored, water soluble syrup could not be crystallized.

EXAMPLE 10

The cyclohexylamine salt prepared in Example 2 above was evaluated as a rust proofing agent as follows: Rusting of an iron nail immersed in water was almost entirely inhibited when compared vs. a standard by the presence of a small amount of cyclohexylamine-C₈ perchlorofluorocarboxylic acid salt in the water, the salt being essentially insoluble.

EXAMPLE 11

*Preparation of* $Cl(CF_2CFCl)_2CF_2COOH \cdot NH{=}C(OH)NH_2$

To an ether solution of 0.1 mole of $$Cl(CF_2CFCl)_2CF_2COOH$$

is added, in small portions with stirring (until dissolution), 0.1 mole of urea. The ether is removed by heating the solution on a steam bath and the residue is crystallized from cyclohexane and water.

EXAMPLE 12

*Preparation of* $Cl(CF_2CFCl)_3CF_2COOH \cdot N(C_6H_5){=}CHC_6H_5$

To a methylene chloride solution of 0.1 mole of $Cl(CF_2CFCl)_3CF_2COOH$, is added in portions with cooling as necessary, 0.1 mole of benzalaniline in methylene chloride. The solvent is evaporated and the residual salt is crystallized from petroleum ether.

EXAMPLE 13

*Preparation of* $ClCF_2CFClCF_2COOH \cdot NH{=}C(NH_2)C_6H_5$

An aqueous solution of 0.15 mole of $$ClCF_2CFClCF_2COOH$$

is added, in portions with cooling to 0.15 mole of benzamidine hydrochloride in 50 ml. of water. The solution is cooled and the salt is filtered and dried. It is then purified by crystallization from an organic solvent such as hexane.

EXAMPLE 14

*Preparation of* $Cl(CF_2CFCl)_4CF_2COOH \cdot NH_2NHC_6H_5$

To an ether solution of 0.2 mole of $$Cl(CF_2CFCl)_4CF_2COOH$$

is added, in portions with stirring and cooling, 0.2 mole of phenylhydrazine in 100 ml. of ether. The solvent is removed by evaporation with a nitrogen stream and the residue crystallized from an organic solvent such as petroleum ether.

EXAMPLE 15

*Preparation of* $C_5H_5N \cdot HOOC(CF_2CFCl)_3COOH \cdot NC_5H_5$

To a methylene chloride solution of 0.35 mole of pyridine is added, in portions with stirring and cooling, 0.10 mole of $HOOC(CF_2CFCl)_3COOH$ in methylene chloride. The solvent is evaporated and the residue crystallized from ethanol and water.

It will be obvious to those skilled in the art that many modifications may be made within the scope of the present invention without departing from the spirit thereof, and the invention includes all such modifications.

We claim:

A compound having the formula

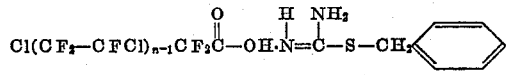

in which *n* is an integer from 2 to 6.

References Cited in the file of this patent

UNITED STATES PATENTS

| | | |
|---|---|---|
| 544,933 | Schmidt et al. | Aug. 20, 1895 |
| 2,549,892 | Channey | Apr. 24, 1951 |
| 2,559,629 | Berry | July 10, 1951 |
| 2,567,011 | Diesslin et al. | Sept. 4, 1951 |
| 2,765,851 | Bond | Oct. 9, 1956 |
| 2,790,815 | Brice | Apr. 30, 1957 |

OTHER REFERENCES

Herman Chemical Abstracts, vol. 45, col. 6488.

Henne: J. Am. Chem. Soc., vol. 76, pp. 479–481 (1954).

UNITED STATES PATENT OFFICE

CERTIFICATE OF CORRECTION

Patent No. 2,920,086 January 5, 1960

William S. Barnhart et al.

It is hereby certified that error appears in the printed specification of the above numbered patent requiring correction and that the said Letters Patent should read as corrected below.

Column 3, line 1, for "mix-" read -- mixture --; column 5, line 13, for that portion of the formula reading "+COOH" read -- COOH --; line 31, for that portion of the formula reading "+CF$_2$COOH" read -- CF$_2$COOH --.

Signed and sealed this 27th day of September 1960.

(SEAL)
Attest:

KARL H. AXLINE
Attesting Officer

ROBERT C. WATSON
Commissioner of Patents